(12) United States Patent
Matsuo

(10) Patent No.: US 6,687,265 B1
(45) Date of Patent: Feb. 3, 2004

(54) ATM-WAN AUDIO COMMUNICATION SELECTING SYSTEM

(75) Inventor: Shinichiro Matsuo, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/233,011

(22) Filed: Jan. 19, 1999

(30) Foreign Application Priority Data

Jul. 6, 1998 (JP) ............................................ 10-190471

(51) Int. Cl.$^7$ ................................................ H04J 3/00
(52) U.S. Cl. .......................................... 370/522; 370/537
(58) Field of Search ................................. 370/465, 466, 370/477, 521, 522, 524, 395.1, 333, 351, 352, 389, 442, 535, 537, 347, 498

(56) References Cited

U.S. PATENT DOCUMENTS

| | | | | |
|---|---|---|---|---|
| 5,381,412 A | * | 1/1995 | Otani | .......................... 370/84 |
| 5,802,045 A | * | 9/1998 | Kos et al. | ................... 370/352 |
| 5,949,791 A | * | 9/1999 | Byers et al. | ................. 370/466 |
| 6,021,136 A | * | 2/2000 | Bharucha et al. | ........... 370/477 |

* cited by examiner

*Primary Examiner*—Chi Pham
*Assistant Examiner*—Alexander O. Boakye
(74) *Attorney, Agent, or Firm*—Katten Muchin Zavis Rosenman

(57) ABSTRACT

An AWN (#1) extracts a destination PBX node number from destination address information included in an N-ISDN SETUP message received from a PBX, decides the type of an audio CODEC corresponding to the PBX node number, and selects an audio CODEC corresponding to the type. An AWN (#2) extracts destination PBX node number from destination address information included in an N-ISDN SETUP message received from an AWN (#1), decides the type of an audio CODEC corresponding to the PBX node number, and selects an audio CODEC corresponding to the type. Thus, an audio CODEC is selected corresponding to a destination route. Consequently, a digital one-link connection is accomplished.

13 Claims, 18 Drawing Sheets

| PBX NODE NUMBER | ATM ADDRESS |
|---|---|
| PBX1 | AtmAdr001 |
| PBX2 | AtmAdr002 |
| PBX3a | AtmAdr002 |
| PBX3b | AtmAdr002 |
| PBX3c | AtmAdr002 |
| | |

FIG. 4

| PBX NODE NUMBER | AUDIO COMPRESSION CODEC TYPE |
|---|---|
| PBX1 | — |
| PBX2 | — |
| PBX3a | $C_1$ |
| PBX3b | $C_2$ |
| PBX3c | $C_3$ |
| PBX4c | $C_3$ |
|  |  |

FIG. 5

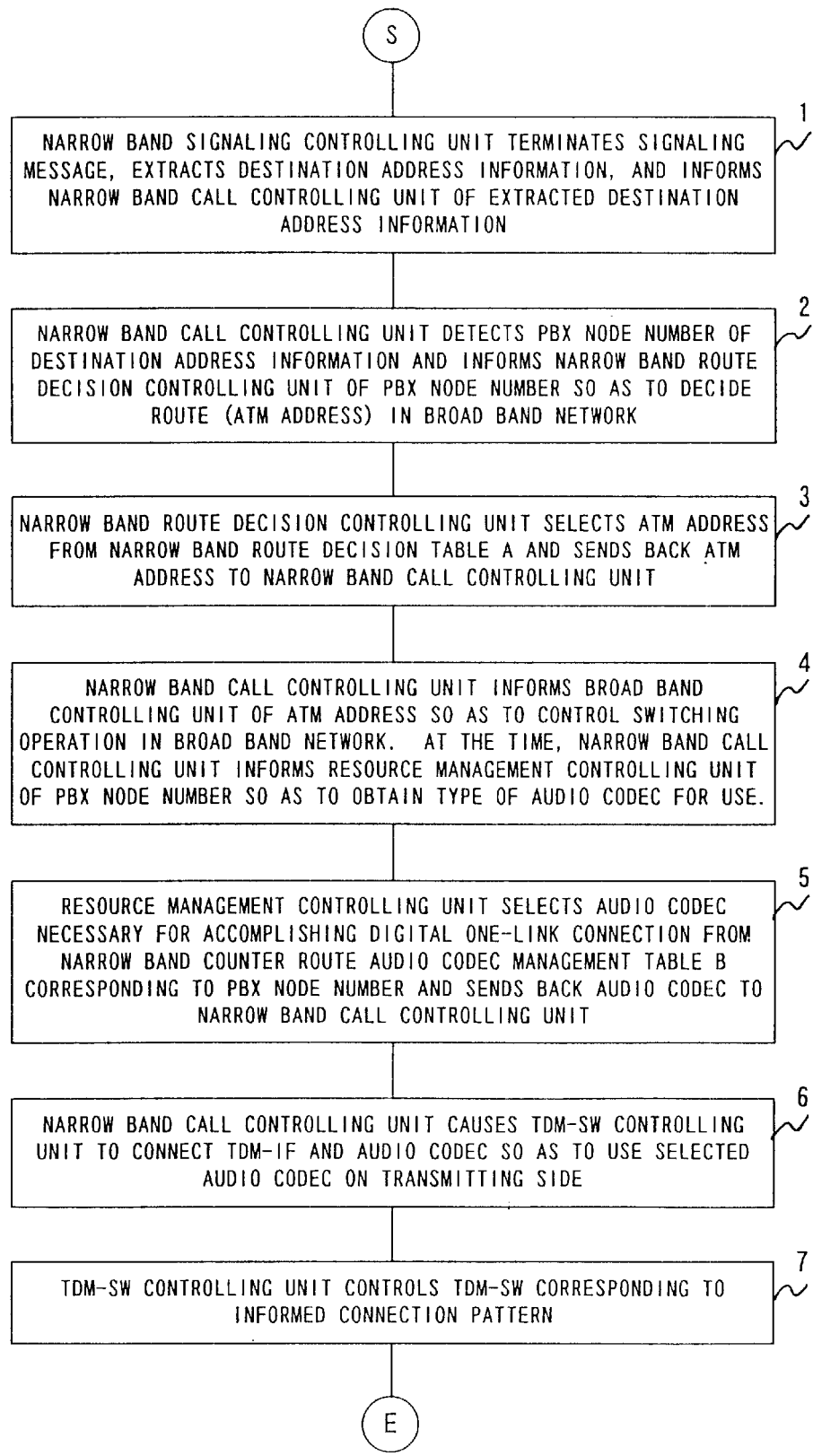
F I G. 6

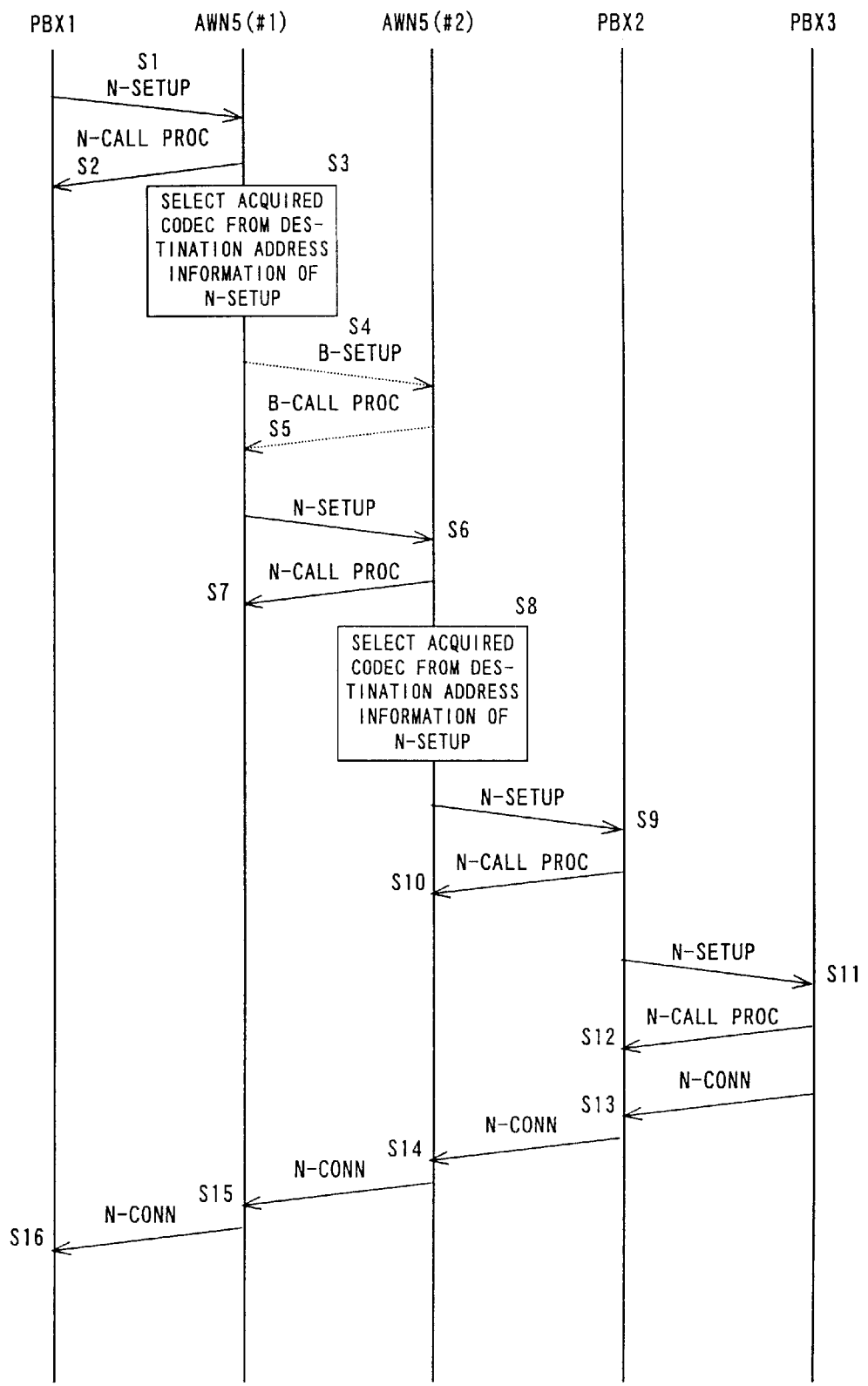
F I G. 8

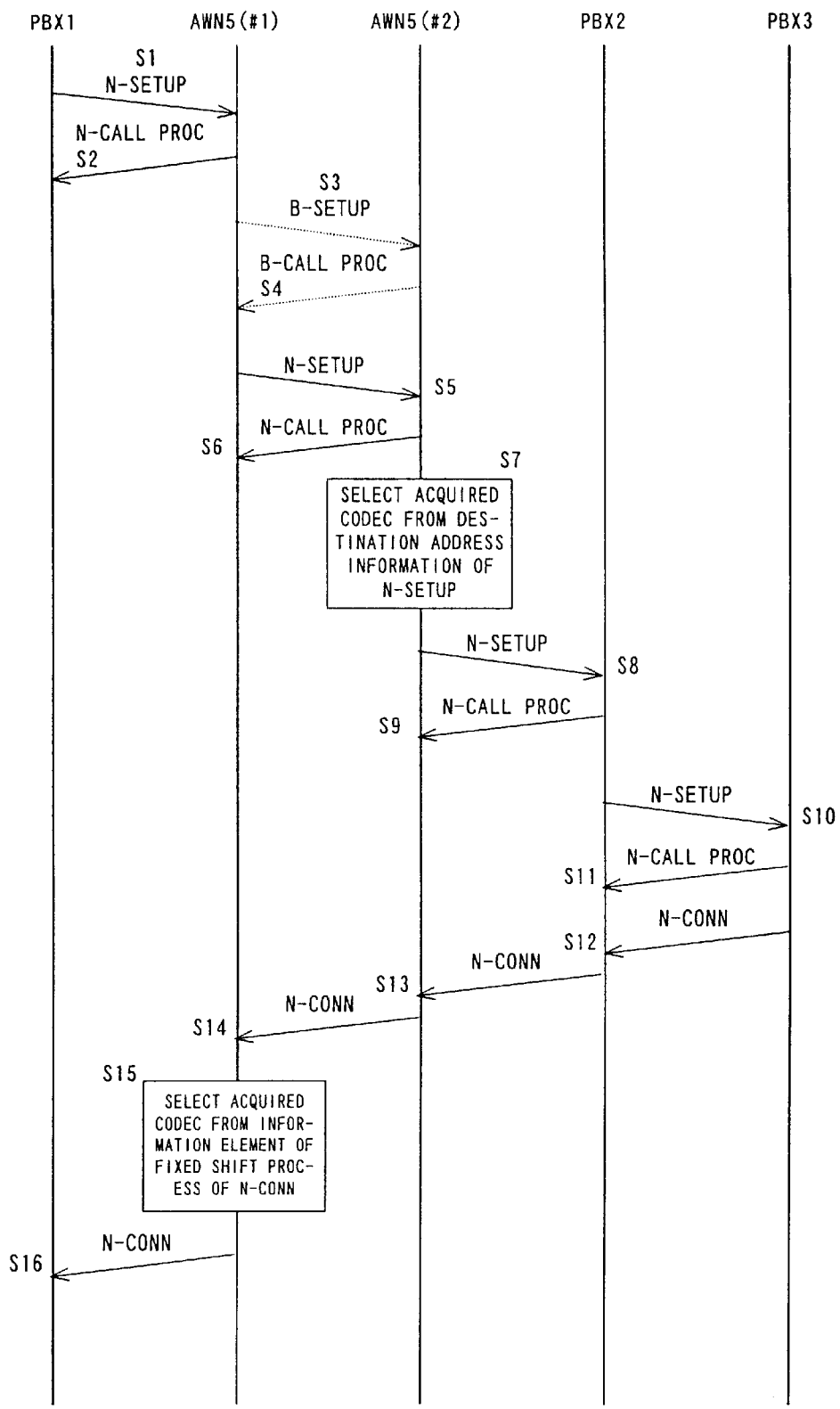
F I G. 1 1

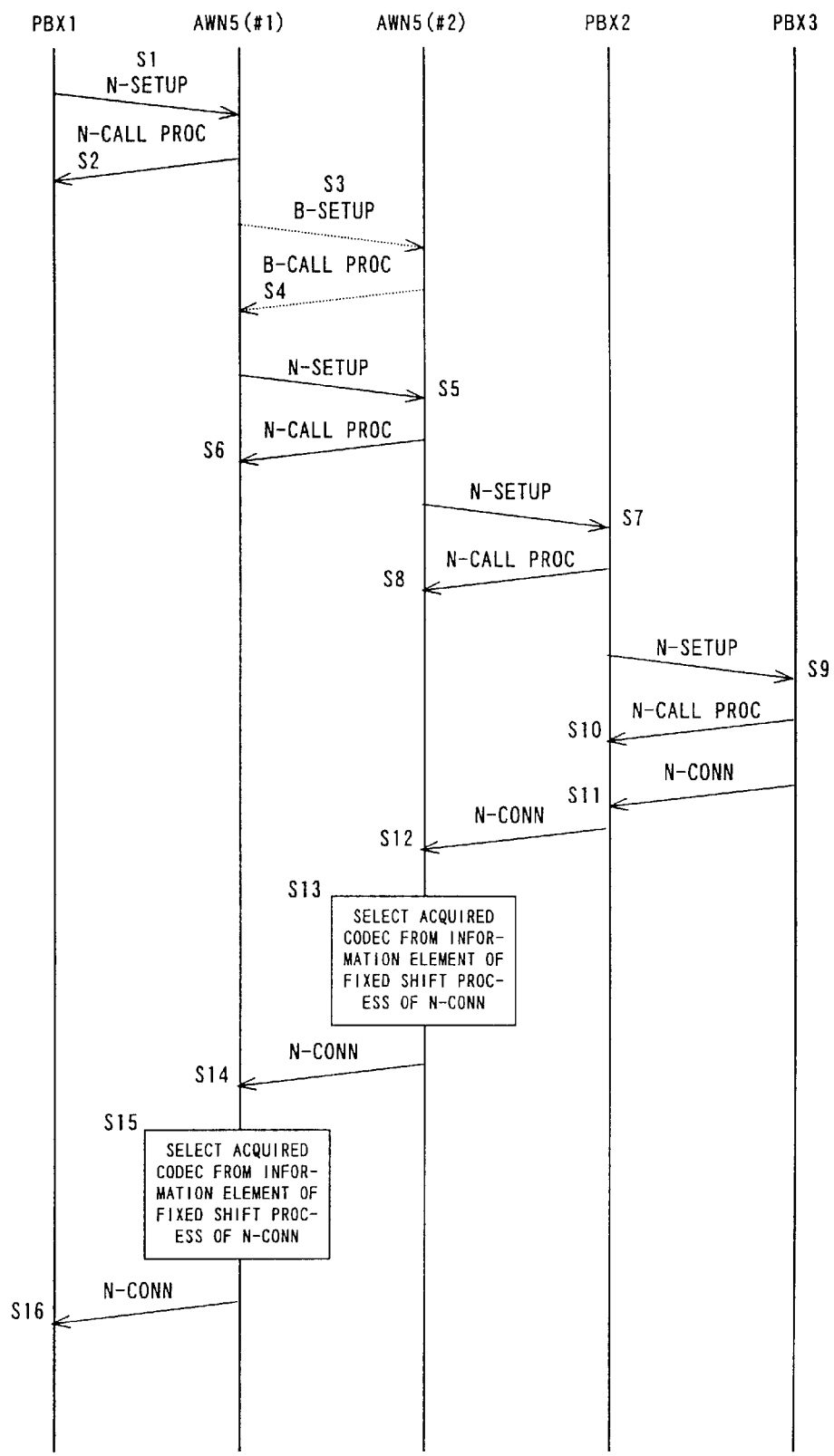
F I G. 1 3

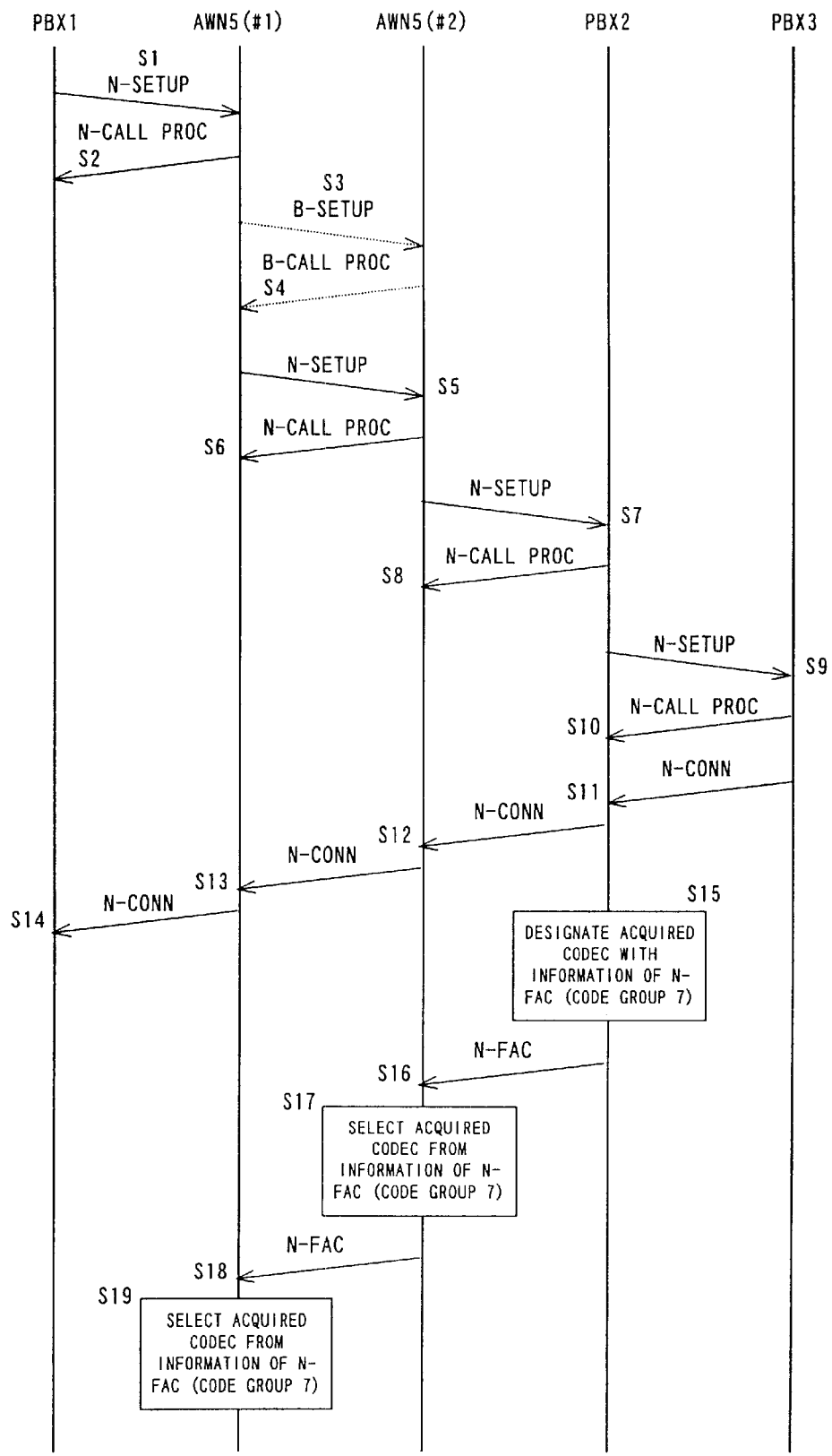
F I G. 1 4

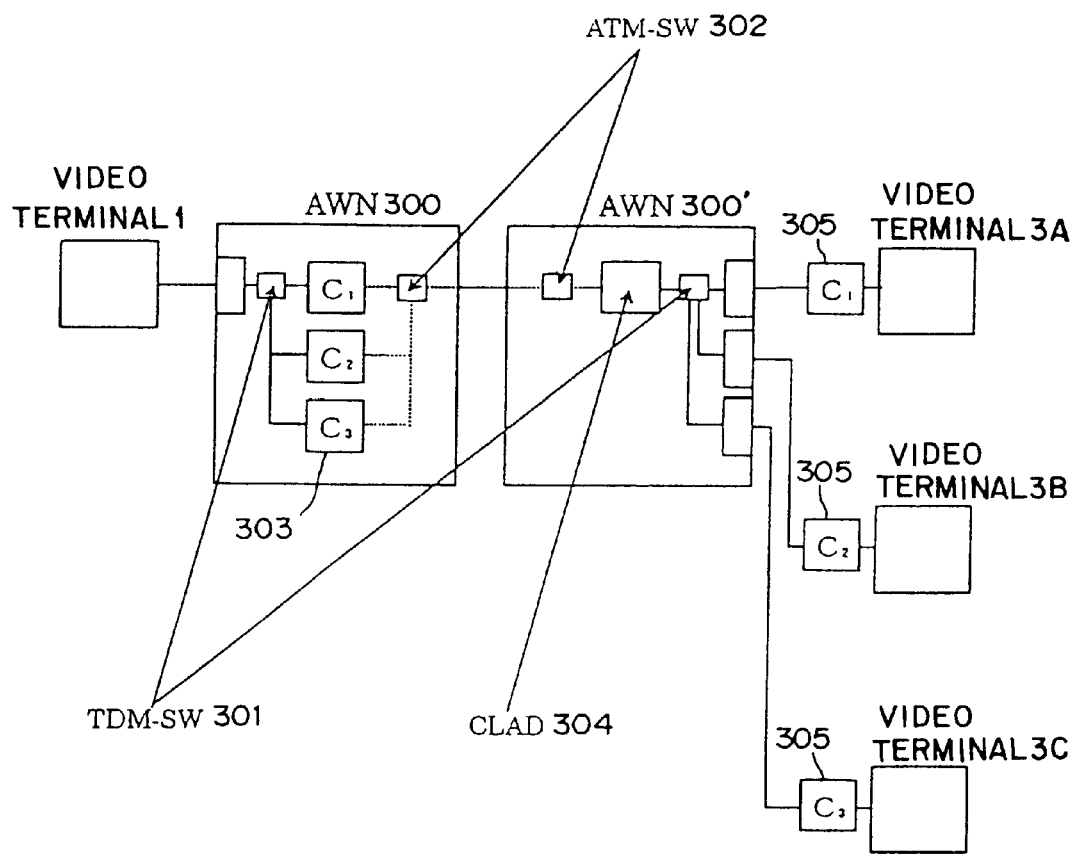
F I G. 18

ATM-WAN AUDIO COMMUNICATION SELECTING SYSTEM

BACKGROUND OF THE INVENTION

1. Field of the Invention

The present invention relates to an audio CODEC (audio coder/decoder) selection controlling system in an integrated network composed of a broad band network (B-ISDN) and a narrow band network (CAS/N-ISDN).

2. Description of the Related Art

In recent years, as technologies of asynchronous transfer mode (ATM) have advanced and become common, the conventional time division multiplexing (TDM) line relaying network has been substituted with ATM line relaying network. To effectively use the band of a communication line, it is necessary to allow an audio CODEC used in a broad band network and an audio CODEC used in a narrow band network to co-exist. Thus, a means for selecting a proper audio CODEC for each audio communication is required.

In a conventional TDM unit, to effectively use the band of a communication line, a reserved dedicated audio CODEC is connected and an audio communication is performed with a reserved compression ratio.

In reality, in an integrated network shown in FIG. 1, audio data of 64 kbps (kilo-bits/second) transmitted from a PBX1a is compressed to audio data of 8 kbps by an audio CODEC (C1) of a TDM unit connected to the PBX1a. The compressed audio data is decompressed to audio data of 64 kbps by the audio CODEC (C1) of a TDM unit connected to a PBX2 on the upper left of the figure.

In addition, audio data of 64 kbps transmitted from the PBX2 is compressed to audio data of 8 kbps by an audio CODEC (C1) of a TDM unit connected on the right of the PBX2. The compressed audio data is decompressed to audio data of 64 kbps by an audio CODEC (C1) of a TDM unit connected to a PBX3a.

At this point, when audio data is relay-connected, if it is repeatedly compressed and decompressed, the quality of audio data deteriorates. Thus, in the case that the type (compression format) of a transmitting side audio CODEC is the same as the type of a receiving side audio CODEC, when a communication route is set between TDM units connected to the PBX2, a communication negotiation is performed therebetween. In this region, audio data is neither compressed, nor decompressed. This system is referred to as digital one-link system. In this system, audio data that has been compressed to 8 kbps by an audio CODEC (C1) of a TDM unit on the PBX1a side is transmitted to a TDM unit on the PBX3a side in the same compression format. The compressed audio data is decompressed by an audio CODEC (C1) of the TDM unit.

However, in the related art reference, each TDM unit does not have a route selecting function. Instead, the PBX2 selects a route. Thus, in FIG. 1, when the PBX1a and the PBX3b are connected, since the type of the audio CODEC (C1) of the TDM unit connected to the PBX1a is different from the type of the audio CODEC (C2) of the TDM unit connected to the PBX3b, the digital one-link cannot be accomplished with the PBX2 interposed therebetween.

SUMMARY OF THE INVENTION

The present invention is made from the above-described point of view. An object of the present invention is to provide a function for allowing an AWN broad band—narrow band connection node unit to select an audio CODEC corresponding to a route of a connected destination side narrow band network considering that an ATM-WAN node has a function for deciding a route corresponding to address information of a narrow band network so as to accomplish a digital one-link system in an integrated network.

The present invention is based on a broad band—narrow band connection node unit (AWN 5) for communicating digital data between a narrow band network and a broad band network in an encoding/decoding format that is the same as an encoding/decoding format used on a communication route in the narrow band network of an integrated network composed of the broad band network and the narrow band network.

At least one encoding/decoding unit (an audio CODEC 9 or a video encoding/decoding unit 203) has a digital one-link function that causes compressed digital data (audio data and/or video data) to be passed and compressed/decompressed only at a communication termination point depending on the setting of the compressed digital data so as to prevent the quality of the digital data from deteriorating.

An individual route encoding/decoding type managing unit (narrow band destination route audio CODEC management table b) stores the relation between each destination route (PBX node number) in the narrow band network and each type of the encoding/decoding unit used on each route.

An encoding/decoding unit selecting unit (a narrow band call controlling unit 12, a narrow band signaling controlling unit 13, a TDM-SW controlling unit 14, or a narrow band route decision controlling unit 15) asks the individual destination route encoding/decoding type managing unit for the type of the encoding/decoding unit corresponding to the destination route information (PBX node number) included in signaling data and selecting one of the encoding/decoding unit, among a plurality of encoding/decoding units, corresponding to the obtained type.

In the structure of the present invention, after the broad band—narrow band connection node unit that is directly connected to a route selecting unit (a PBX2) in the narrow band network selects an encoding/decoding unit corresponding to a destination route in the narrow band network, the broad band—narrow band connection node unit informs a destination side broad band—narrow band connection node unit of the type information of the selected one of the encoding/decoding units and the destination side broad band—narrow band connection node unit selects one of the encoding/decoding units corresponding to the informed type information.

In such an additional structure, the broad band—narrow band connection node unit that is directly connected to the route selecting unit in the narrow band network selects one of the encoding/decoding units corresponding to the type information of the encoding/decoding unit that is used in the destination route and received from the route selecting unit.

Moreover, in the structure of the present invention, when the type of the encoding/decoding unit used in the narrow band network is changed during communication, the broad band—narrow band connection node unit and the destination side broad band—narrow band connection node unit exchange the type information of the encoding/decoding unit that was changed so as to change the encoding/decoding unit used in the broad band—narrow band connection node unit and the destination side broad band—narrow band connection node unit to the encoding/decoding unit corresponding to the type information.

According to the present invention, since each encoding/ decoding unit used in a broad band network is matched with each encoding/decoding unit used in a narrow band network, the conventional encoding/decoding unit can be connected in data one-link structure. Thus, in addition to the multiplexing function of a broad band network, communication data can be compressed. Consequently, the transmission efficiency can be further improved.

BRIEF DESCRIPTION OF THE DRAWINGS

These and other objects, features and advantages of the present invention will become more apparent in light of the following description of preferred embodiments thereof, as illustrated in the accompanying drawings.

In the drawings,

FIG. 4 is a schematic diagram showing a narrow band route decision table a;

FIG. 5 is a schematic diagram showing a narrow band destination route audio CODEC management table b;

FIG. 6 is a flowchart showing a transmitting side process of an operation of an AWN according to a first preferred embodiment;

FIG. 8 is a sequence chart showing the operation of the AWN according to the first preferred embodiment;

FIG. 11 is a sequence chart showing an operation of an AWN according to a second preferred embodiment;

FIG. 13 is a sequence chart showing an operation of an AWN according to a third preferred embodiment;

FIG. 14 is a sequence chart showing an operation of an AWN according to a fourth preferred embodiment;

FIG. 18 is a schematic diagram showing a second example of the structure of a system including video terminals.

DESCRIPTION OF PREFERRED EMBODIMENTS

Next, with reference to the accompanying drawings, preferred embodiments of the present invention will be described.

Figure 1:
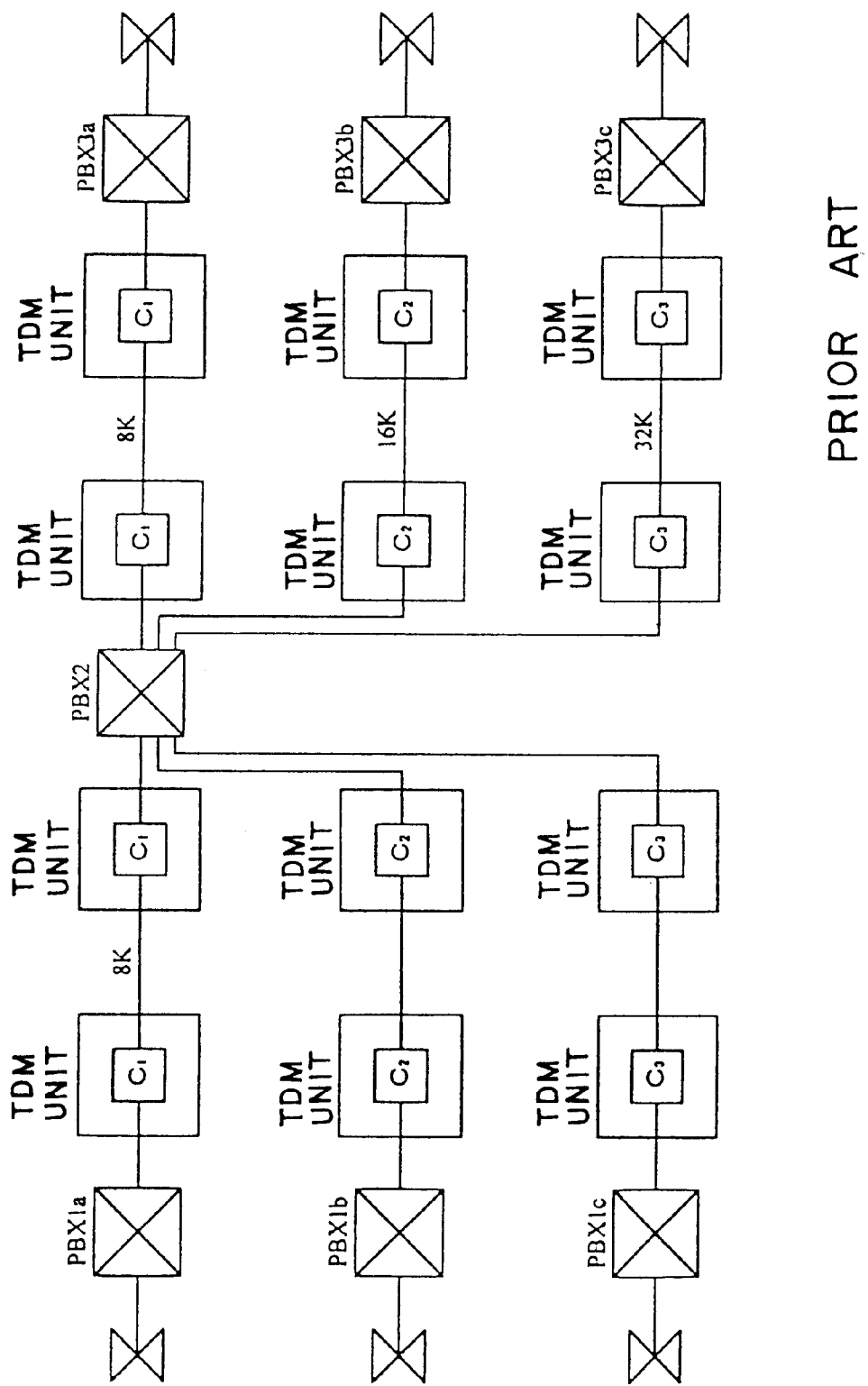
FIG. 1 is a schematic diagram for explaining a related art reference.
Figure 2:
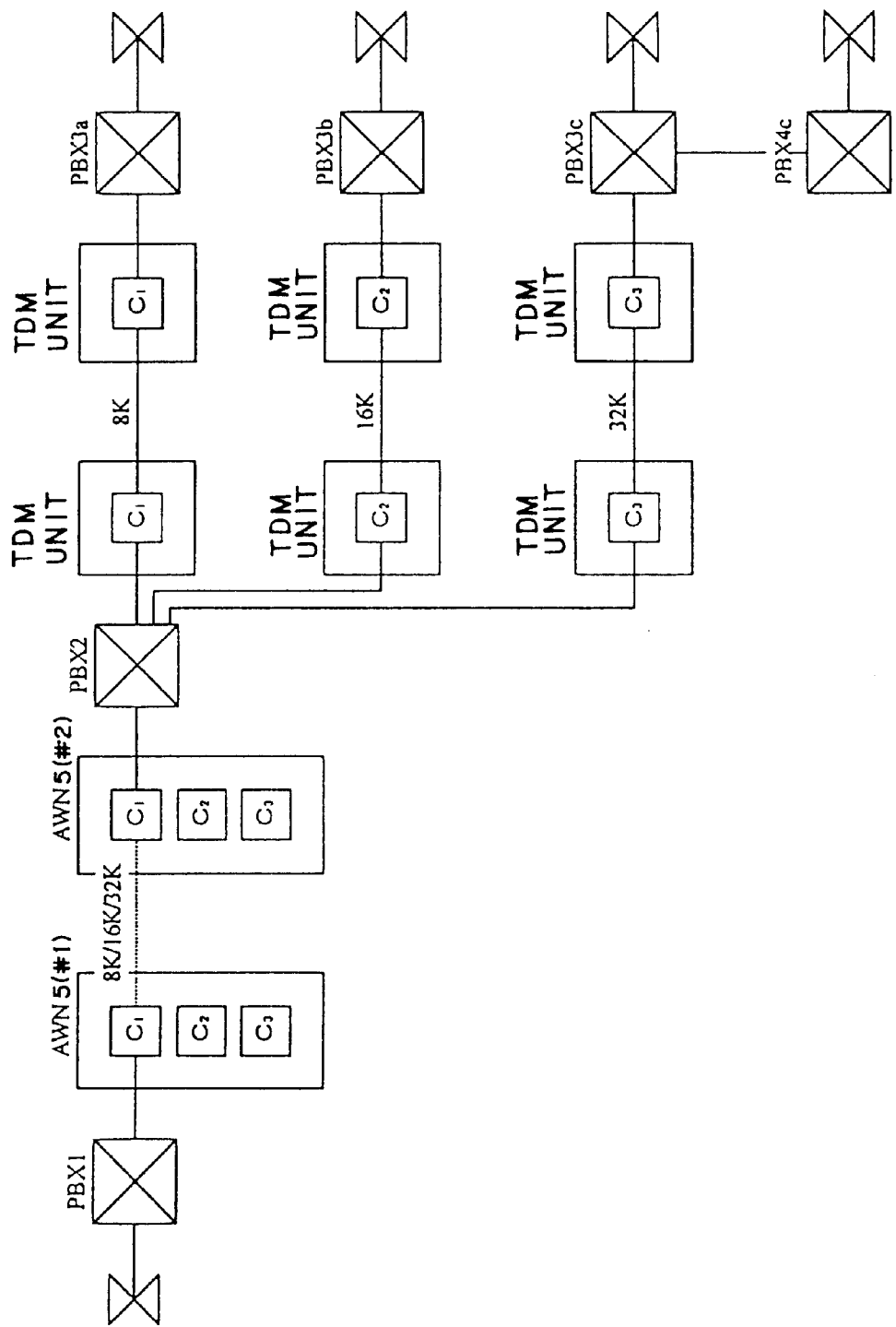
FIG. 2 is a schematic diagram showing the structure of a network according to a preferred embodiment of the present invention.

In FIG. 2, at least a transmitting side network disposed between a PBX1 and a PBX2 includes an ATM-WAN node 5 that has an audio CODEC selecting function (hereinafter, the ATM-WAN node 5 is referred to as AWN 5). As shown in FIG. 2, a receiving side network disposed between the PBX2 and PBX3a to PBX3c may include only conventional TDM units or AWNs as with the structure shown in FIG. 1.

Figure 3:
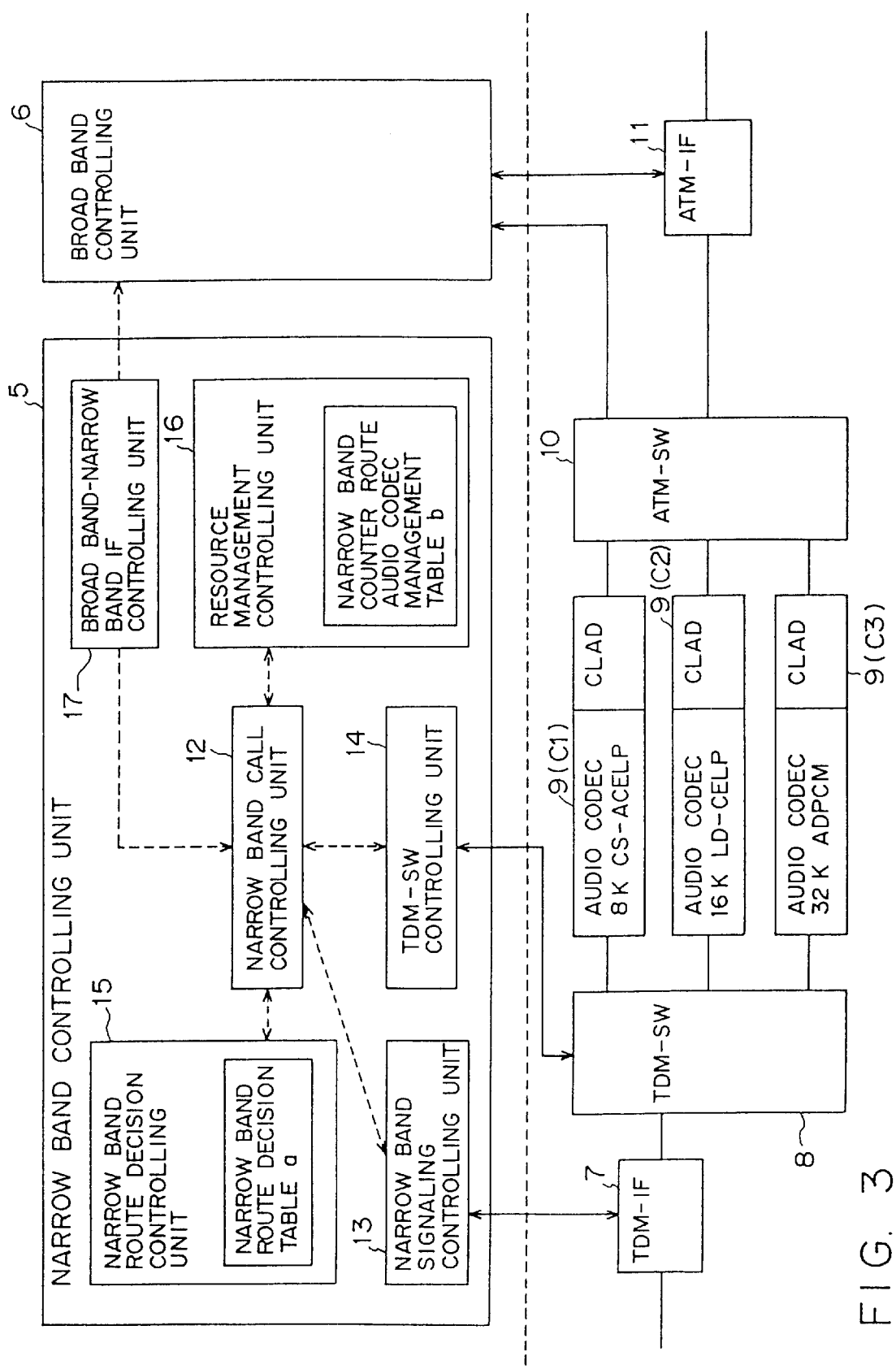
FIG. 3 is a schematic diagram showing the structure of an AWN according to a preferred embodiment of the present invention.

FIG. 3 is a schematic diagram showing the structure of the AWN 5 shown in FIG. 2.

The AWN 5 can accommodate a plurality of selectable audio CODECs 9 that perform the digital one-link connection. Each audio CODEC 9 has an ATM cell assembling/ disassembling function (CLAD). Each audio CODEC 9 is interfaced with an ATM-SW 10.

A narrow band controlling unit 5 controls a narrow band line (N-ISDN) connected to a TDM interface circuit 7 (TDM-IF 7). A broad band controlling unit 6 controls a broad band line (ATM line) connected to an ATM interface circuit 11 (ATM-IF 11).

A narrow band call controlling unit 12 of the narrow band controlling unit 5 has a call managing function, a resource acquiring function, and a connection controlling function. The call managing function is used to manage a call in a narrow band network. The resource acquiring function is used to acquire a resource for use corresponding to a route selected corresponding to signaling information. The controlling function is used to manage and control connections among individual resources.

A narrow band signaling controlling unit 13 of the narrow band controlling unit 5 terminates a signaling message received from the TDM-IF 7 in the narrow band network.

A TDM-SW controlling unit 14 of the narrow band controlling unit 5 controls a switching operation of a TDM bus switch circuit 8 (TDM-SW 8) that connects individual resources.

A narrow band route decision controlling unit 15 of the narrow band controlling unit 5 manages a narrow band route decision table a that stores the relation between PBX node numbers contained in narrow band signaling information and broad band ATM addresses as shown in FIG. 4.

A resource management controlling unit 16 of the narrow band controlling unit 5 manages a narrow band destination route audio CODEC management table b that stores the relation between PBX node numbers and audio CODEC types for individual narrow band routes as shown in FIG. 5.

The broad band controlling unit 6 controls an ATM switch circuit 10 (ATM-SW 10) and an ATM-IF 11.

The operation of a broad band—narrow band IF controlling unit 17 will be described in the section of "the operation of an AWN 5 according to a second preferred embodiment".

In the AWN 5 shown in FIG. 3, a PBX node number is uniquely correlated with a route in the narrow band network. The type of the audio CODEC 9 used on the route in the narrow band network is set to the narrow band destination route audio CODEC management table b. Thus, when a destination address in the broad band network is decided corresponding to the PBX node number in the destination address information of the narrow band network, the audio CODEC 9 with the same type (compression format) as the audio CODEC used in the narrow band network can be selected.

Next, the operation of the AWN 5 according to a first preferred embodiment will be described.

The operation of the transmitting side AWN 5 (#1) will be described with reference to a process flowchart shown in FIG. 6 and a sequence chart shown in FIG. 8.

Figure 9:
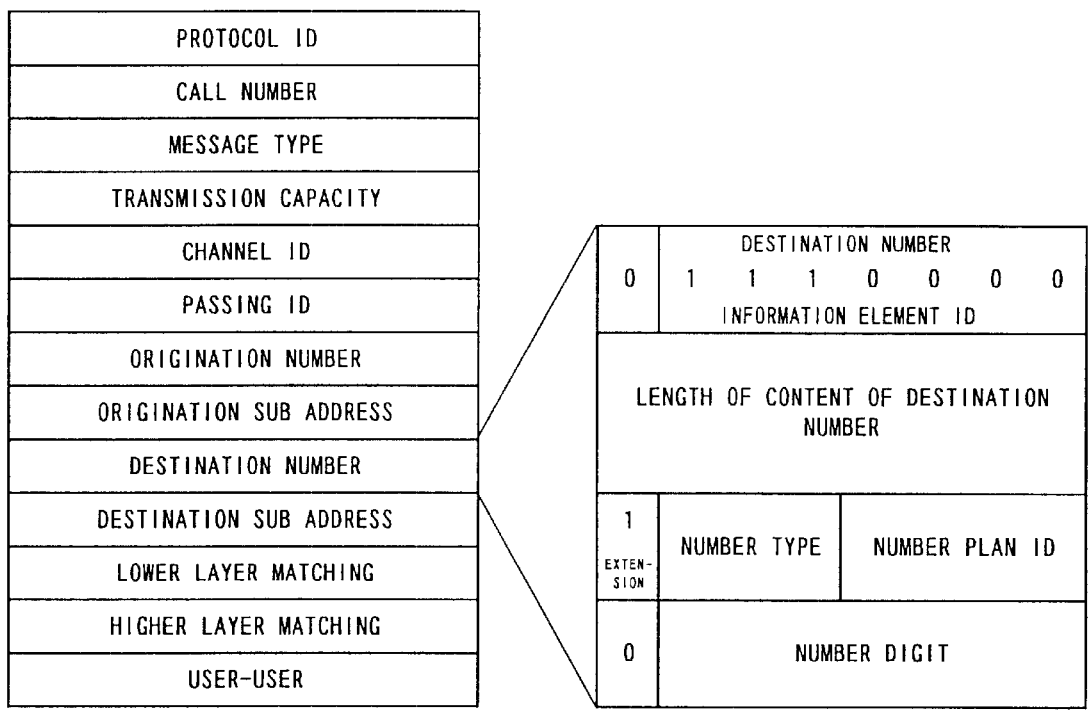
FIG. 9 is a schematic diagram showing the structure of a SETUP (N-ISDN) message.

The PBX1 shown in FIG. 2 transmits an N-ISDN SETUP message (N-SETUP message) to the AWN 5 (#1). FIG. 9 shows the structure of the N-SETUP message.

The narrow band signaling controlling unit 13 terminates the N-SETUP message, extracts a number digit as destination address information from a destination number information element of the N-SETUP message shown in FIG. 9, and informs the narrow band call controlling unit 12 of the extracted number digit (at step 1 shown in FIG. 6 and S1 shown in FIG. 8). The narrow band signaling controlling unit 13 sends back an N-CALL PROC message to the PBX1 (at S2 shown in FIG. 8).

The narrow band call controlling unit 12 detects the PBX node number with the number digit as the received destination address information and informs the narrow band route decision controlling unit 15 of the PBX node number so as to decide the route (ATM address) in the broad band network (at step 2 shown in FIG. 6 and S3 shown in FIG. 8).

The narrow band route decision controlling unit 15 selects an ATM address for the informed PBX node number from the narrow band route decision table a shown in FIG. 4 and sends back the selected ATM address to the narrow band call controlling unit 12 (at step 3 shown in FIG. 6 and S3 shown in FIG. 8).

The narrow band call controlling unit 12 informs the broad band controlling unit 6 of the ATM address so that the broad band controlling unit 6 controls a switching operation in the broad band network. At the point, the narrow band call controlling unit 12 informs the resource management controlling unit 16 of the PBX node number extracted from the destination address information so as to detect the type of the audio CODEC for use (at step 4 shown in FIG. 6 and S3 shown in FIG. 8).

With a key of the informed PBX node number, the resource management controlling unit 16 references the narrow band destination route audio CODEC management table b shown in FIG. 5, selects the type of the audio CODEC 9 necessary for accomplishing the digital one-link connection, and sends back the type of the audio CODEC 9 to the narrow band call controlling unit 12 (at step 5 shown in FIG. 6 and S3 shown in FIG. 8).

The narrow band call controlling unit 12 causes the TDM-SW controlling unit 14 to connect the TDM-IF 7 and the selected audio CODEC 9 so as to use the audio CODEC 9 selected by the resource management controlling unit 16 as a transmitting side audio CODEC (at step 6 shown in FIG. 6 and S3 shown in FIG. 8).

The TDM-SW controlling unit 14 controls the TDM-SW 8 corresponding to the informed connection pattern (at step 7 shown in FIG. 6 and S3 shown in FIG. 8).

Next, with reference to a flowchart shown in FIG. 7 and a sequence chart shown in FIG. 8, the operation of the receiving side AWN 5 will be described.

Figure 10:
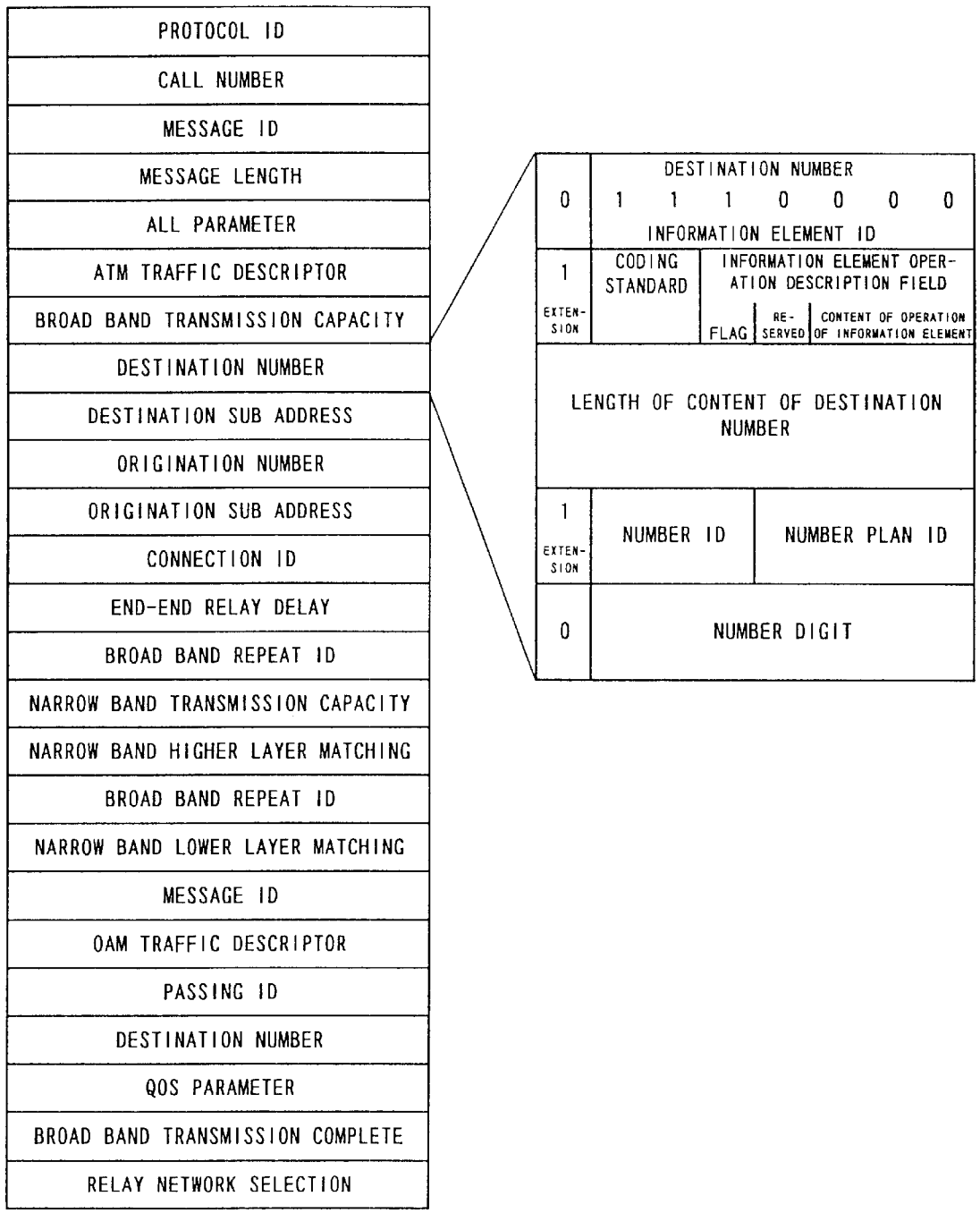
FIG. 10 is a schematic diagram showing the structure of a SETUP (B-ISDN) message.

The broad band controlling unit 6 of the transmitting side AWN 5 (#1) informs the broad band controlling unit 6 of the receiving side AWN 5 (#2) of a B-ISDN SETUP message (B-SETUP message) shown in FIG. 10 (at S4 shown in FIG. 8). The receiving side AWN 5 (#2) sends back a B-CALL PROC message to the transmitting side AWN 5 (#1) (at S5 shown in FIG. 8). Thus, the transmitting side AWN 5 (#1) and the receiving side AWN 5 (#2) are connected in a broad band level.

Figure 7:
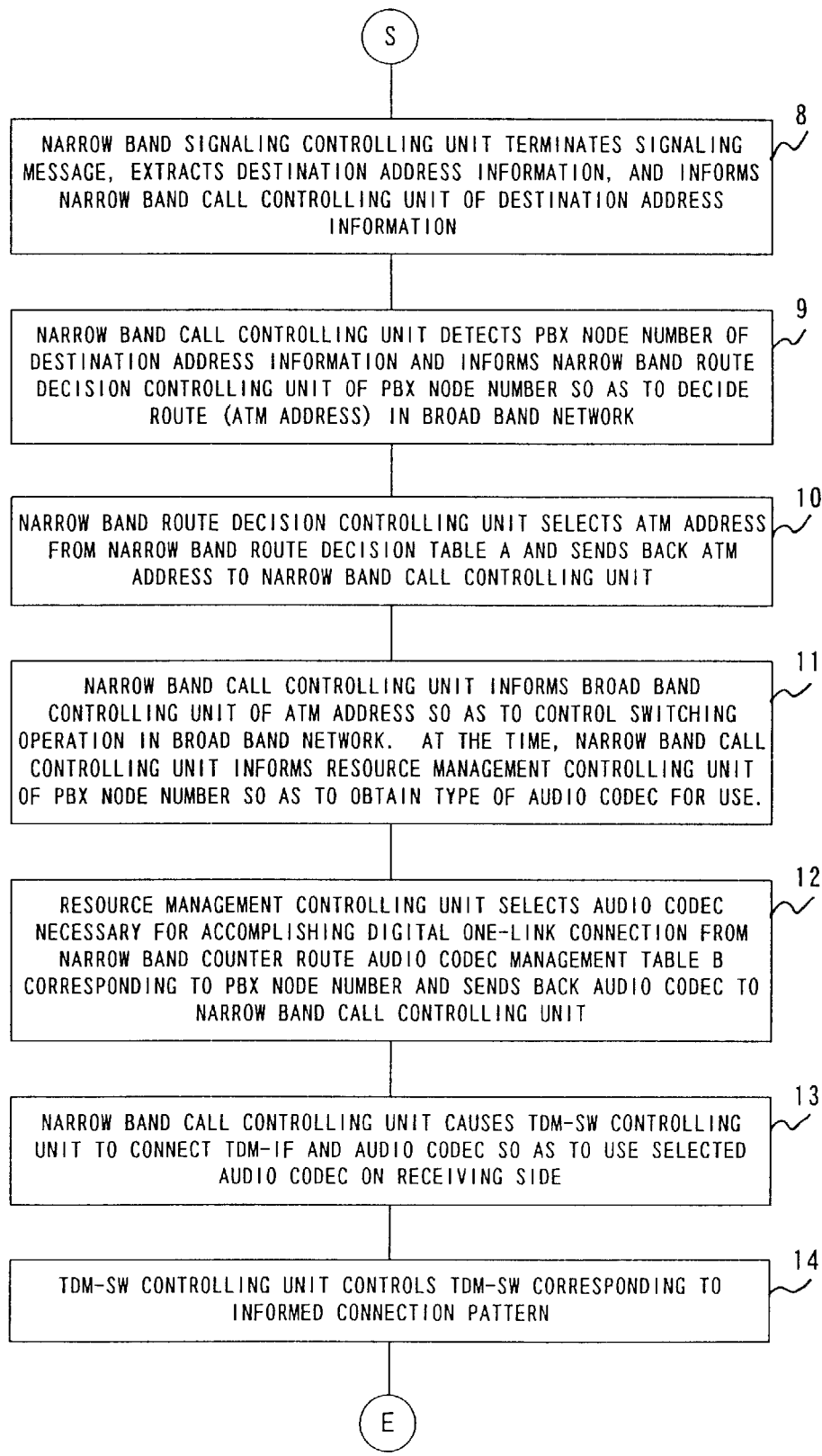
FIG. 7 is a flowchart showing a receiving side process of the operation of the AWN according to the first preferred embodiment.

Thereafter, the narrow band signaling controlling unit 13 of the transmitting side AWN 5 (#1) informs the narrow band signaling controlling unit 13 in the transmitting side AWN 5 (#2) of an N-SETUP message shown in FIG. 9 (at S6 shown in FIG. 8);

The receiving side narrow band signaling controlling unit 13 terminates the N-SETUP message, extracts a number digit as destination address information from a destination number information element of the N-SETUP message shown in FIG. 9, and informs the receiving side narrow band call controlling unit 12 of the extracted number digit (at step 8 shown in FIG. 7 and S6 shown in FIG. 8). The receiving side narrow band signaling controlling unit 13 sends back the N-CALL PROC message to the narrow band signaling controlling unit 12 of the transmitting side AWN 5 (at S7 shown in FIG. 8).

The receiving side narrow band call controlling unit 12 detects a PBX node number with a number digit as the received destination address information and informs the receiving side narrow band route decision controlling unit 15 of the PBX node number so as to decide the route (ATM address) in the broad band network (at step 9 shown in FIG. 7 and S8 shown in FIG. 8).

The receiving side narrow band route decision controlling unit 15 selects an ATM address for the informed PBX node number from the receiving side narrow band route decision table a shown in FIG. 4 and sends back the selected ATM address to the receiving side narrow band call controlling unit 12 (at step 10 shown in FIG. 7 and S8 shown in FIG. 8).

The receiving side narrow band call controlling unit 12 informs the receiving side broad band controlling unit 6 of the ATM address so that the receiving side broad band controlling unit 6 controls a switching operation in the broad band network. At this point, the receiving side narrow band call controlling unit 12 informs the receiving side resource management controlling unit 16 of the PBX node number extracted from the destination address information so as to obtain the type of the audio CODEC 9 for use (at step 11 shown in FIG. 7 and S8 shown in FIG. 8).

With a key of the informed PBX node number, the receiving side resource management controlling unit 16 references the receiving side narrow band destination route audio CODEC management table b shown in FIG. 5, selects the type of the audio CODEC 9 necessary for accomplishing the digital one-link connection, and sends back the selected type to the receiving side narrow band call controlling unit 12 (at step 12 shown in FIG. 7 and S8 shown in FIG. 8).

The receiving side narrow band call controlling unit 12 causes the receiving side TDM-SW controlling unit 14 to connect the receiving side TDM-IF 7 and the selected receiving side audio CODEC 9 so as to use the audio CODEC 9 selected by the receiving side resource management controlling unit 16 as the receiving side audio CODEC (at step 13 shown in FIG. 13 and S8 shown in FIG. 8).

The receiving side TDM-SW controlling unit 14 controls the receiving side TDM-SW 8 corresponding to the informed connection pattern (at step 14 shown in FIG. 7 and S8 shown in FIG. 8).

Thereafter, the signaling message N-SETUP message and the N-CALL PROC message are successively transmitted from the receiving side AWN 5 (#2) to the PBX2 to the receiving side PBX3 (at steps S9 to S12 shown in FIG. 8). The signaling message N-CONN is successively sent back from the receiving side PBX3 to the PBX2 to the receiving side AWN 5 (#2) to the transmitting side AWN (#1) to the transmitting side PBX1 (at S13 to S16 shown in FIG. 8). Thus, the digital one-link connection is accomplished between the PBX1 and PBX3.

Next, the operation of the AWN 5 shown in FIGS. 2 and 3 according to a second preferred embodiment will be described.

In the operation of the AWN 5 according to the second preferred embodiment, a broad band—narrow band IF controlling unit 17 is disposed in the narrow band controlling unit 5 shown in FIG. 3. The controlling unit inter-works for an N-ISDN message and controls information switching with the counter AWN 5 connected with a particular B-ISDN VC (Virtual Connection).

As with the operation of the AWN 5 according to the first preferred embodiment, the receiving side AWN 5 (#2) (see FIG. 2) acquires an audio CODEC 9 and sends back type information corresponding to the acquired audio CODEC 9 to the transmitting side AWN 5 (#1) (see FIG. 2) through a particular B-ISDN VC. The broad band controlling unit 6 of the transmitting side AWN 5 informs the narrow band controlling unit 5 in the transmitting side AWN 5 of the type information through the broad band—narrow band IF controlling unit 17 of the narrow band controlling unit 5 of the transmitting side AWN 5. Thus, the transmitting side AWN 5 selects an audio CODEC 9 with the same type as the audio CODEC 9 selected by the receiving side AWN 5.

Next, with reference to a sequence chart shown in FIG. 11, the practical control process of the AWN will be described.

A broad band signaling message and a narrow band signaling message are transmitted from the transmitting side PBX1 to the transmitting side AWN 5 (#1) to the receiving side AWN 5 (#2) in the same process as the conventional system (at S1 to S6 shown in FIG. 11).

The narrow band signaling controlling unit 13 of the receiving side AWN 5 (#2) terminates an N-SETUP message received from the transmitting side AWN 5 (#1), extracts a number digit as destination address information from the destination number information element of the N-SETUP message shown in FIG. 9, and informs the receiving side narrow band call controlling unit 12 of the number digit (at S7 shown in FIG. 11).

The receiving side narrow band call controlling unit 12 detects a PBX node number with the number digit as the received destination address information and informs the receiving side narrow band route decision controlling unit 15 of the PBX node number so as to decide the route (ATM address) in the broad band network (at S7 shown in FIG. 11).

The receiving side narrow band route decision controlling unit 15 selects an ATM address corresponding to the informed PBX node number from the receiving side narrow band route decision table a shown in FIG. 4 and sends back the ATM address to the receiving side narrow band call controlling unit 12 (at S7 shown in FIG. 11).

The receiving side narrow band call controlling unit 12 informs the receiving side broad band controlling unit 6 of the ATM address so as to control a switching operation in the broad band network. At this point, the receiving side narrow band call controlling unit 12 informs the receiving side resource management controlling unit 16 of the PBX node number extracted from the destination address information so as to obtain the type of the audio CODEC 9 (at S7 shown in FIG. 11).

With a key of the informed PBX node number, the receiving side resource management controlling unit 16 references the receiving side narrow band destination route audio CODEC management table b shown in FIG. 5, selects the type of the audio CODEC 9 necessary for accomplishing the digital one-link connection, and sends back the selected type to the receiving side narrow band call controlling unit 12 (at S7 shown in FIG. 11).

The receiving side narrow band call controlling unit 12 causes the receiving side TDM-SW controlling unit 14 to connect the receiving side TDM-IF 7 and the selected receiving side audio CODEC 9 so as to use the audio CODEC 9 selected by the receiving side resource management controlling unit 16 as the receiving side audio CODEC (at S7 shown in FIG. 11).

The receiving side TDM-SW controlling unit 14 controls the receiving side TDM-SW 8 corresponding to the informed connection pattern (at S7 shown in FIG. 11).

Thereafter, the N-SETUP message and the N-CALL PROC message are transmitted from the receiving side AWN 5 (#2) to the PBX2 to the receiving side PBX3 (at S8 to S11 shown in FIG. 11). An N-ISDN CONNEect message (N-CONN message) is transmitted from the receiving side PBX3 to the PBX2 to the receiving side AWN 5 (#2) to the transmitting side AWN 5 (#1) (at S12 to S14 shown in FIG. 11).

Figure 12:
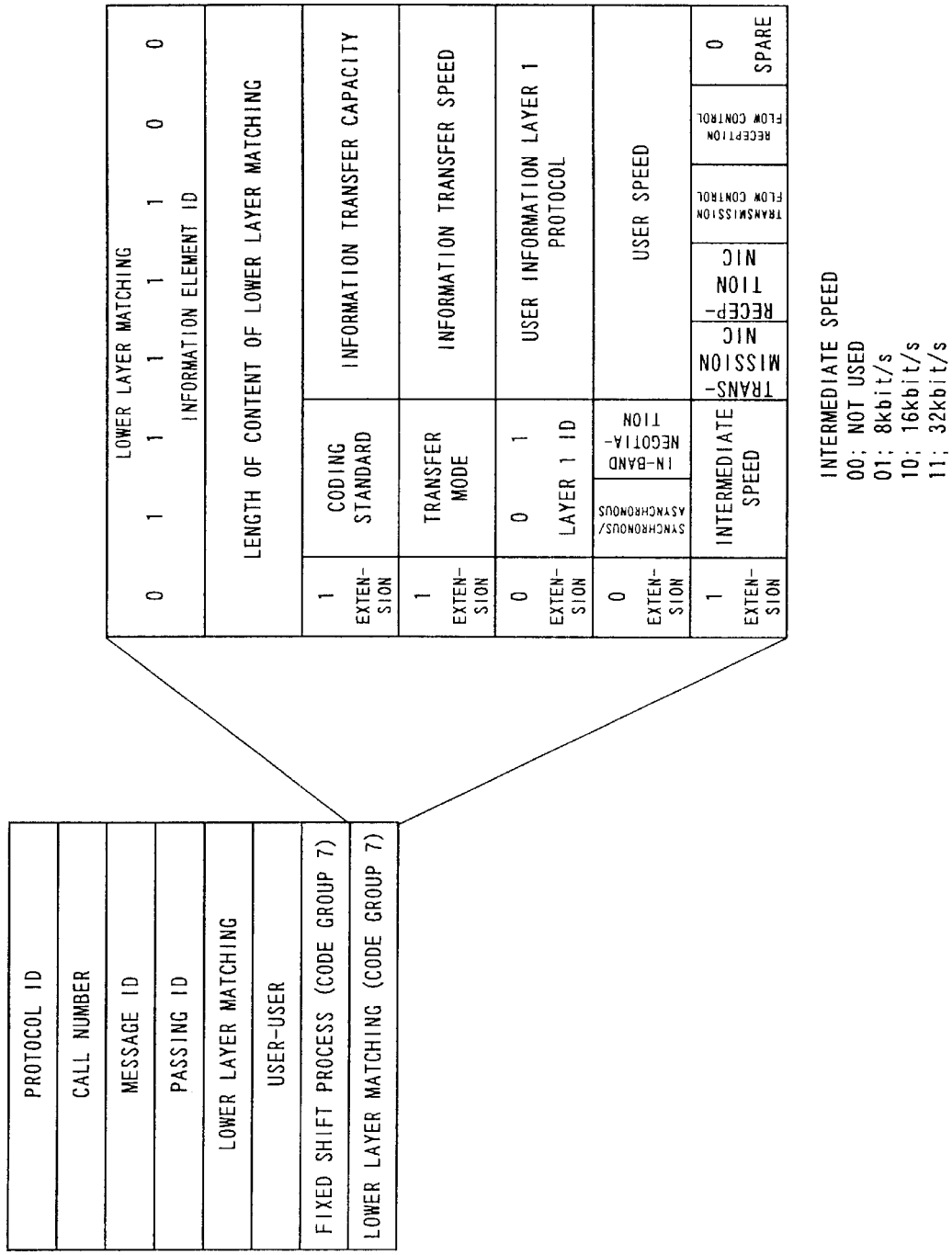
FIG. 12 is a schematic diagram showing the structure of a CONNect (N-ISDN) message.

At this point, the N-CONN message has the structure shown in FIG. 12. The narrow band signaling controlling unit 13 of the receiving side AWN 5 (#2) sets a value (01: 8 kbps, 10: 16 kbps, 11: 32 kbps) corresponding to the type of the audio CODEC 9 selected on the receiving side as type information to an intermediate speed field of a lower layer matching (code group 7) information element of the N-CONN message sent back to the transmitting side AWN 5 (#1).

The N-CONN message is sent back from the receiving side AWN 5 (#2) to the transmitting side AWN 5 (#1) through a particular broad band VC.

The N-CONN message is received by the narrow band call controlling unit 12 through the broad band controlling unit 6 and the broad band—narrow band IF controlling unit 17 of the transmitting side AWN 5 (#1).

The transmitting side narrow band call controlling unit 12 causes the transmitting side TDM-SW controlling unit 14 to connect the transmitting side TDM-IF 7 and the transmitting side audio CODEC 9 corresponding to the type information so as to use the audio CODEC 9 corresponding to the type information contained in the received N-CONN message as a transmitting side audio CODEC (at S15 shown in FIG. 11).

The transmitting side TDM-SW controlling unit 14 controls the transmitting side TDM-SW 8 corresponding to the informed connection pattern (at S15 shown in FIG. 11).

Thereafter, the transmitting side narrow band call controlling unit 12 sends back the N-CONN message to the transmitting side PBX1 through the transmitting side narrow band signaling controlling unit 13 (at S16 shown in FIG. 11). Thus, the digital one-link connection is accomplished between the transmitting side PBX1 and the receiving side PBX3.

Next, the operation of the AWN 5 shown in FIGS. 2 and 3 according to a third preferred embodiment will be described.

As with the operation of the AWN 5 according to the second preferred embodiment, in the operation of the AWN 5 according to the third preferred embodiment, it is assumed that the broad band—narrow band IF controlling unit 17 is disposed in the narrow band controlling unit 5 of the AWN 5, that the PBX2 (see FIG. 2) or the like connected to the receiving side AWN 5 (#2) acquires the type information of the audio CODEC used on the destination route in the receiving side narrow band network with the N-ISDN message, and that the AWN 5 (#2) connected to the PBX2 is informed of the type information with the N-ISDN message.

In the structure, the PBX2 informs the narrow band call controlling unit 12 in the receiving side AWN 5 of the type information of the audio CODEC selected on the destination route in the receiving side narrow band network through the narrow band signaling controlling unit 13 of the receiving side AWN 5 (#2). Thus, the receiving side AWN 5 (#2) selects the audio CODEC 9 corresponding to the type information. The transmitting side AWN 5 (#1) (see FIG. 2) is informed of the type information through a particular B-ISDN VC. The broad band controlling unit 6 of the transmitting side AWN 5 informs the narrow band call controlling unit 12 in the transmitting side AWN 5 of the type information through the broad band—narrow band IF controlling unit 17 of the narrow band controlling unit 5 of the transmitting side AWN 5. Thus, the transmitting side AWN 5 selects an audio CODEC 9 with the same type as the audio CODEC 9 selected on the destination route in the receiving side narrow band network corresponding to the type information.

Next, with reference to a sequence chart shown in FIG. 13, the practical control process will be described.

A broad band signaling message and a narrow band signaling message are transmitted from the transmitting side PBX1 to the transmitting side AWN 5 (#1) to the receiving side AWN 5 (#2) to the PBX2 to the receiving side PBX3 (at S1 to S10 shown in FIG. 13).

Thus, the receiving side PBX3 sends back an N-CONN message to the PBX2 (at S11 shown in FIG. 13).

After receiving an N-CONN message, the PBX2 sends back the N-CONN message to the receiving side AWN 5 (#2) (at S12 shown in FIG. 13). At this point, the N-CONN message has the structure shown in FIG. 12. The PBX2 sets a value (01: 8 kbps, 10: 16 kbps, 11: 32 kbps) corresponding to the type of the audio CODEC selected on the destination route on the receiving side as type information to an intermediate speed field of a lower layer matching (code group 7) information element of the N-CONN message.

The narrow band signaling controlling unit 13 of the receiving side AWN 5 (#2) terminates the N-CONN message sent back from the PBX2 and informs the narrow band call controlling unit 12 in the receiving side AWN 5 (#2) of the information (at S13 shown in FIG. 13).

The receiving side narrow band call controlling unit 12 causes the receiving side TDM-SW controlling unit 14 to connect the receiving side TDM-IF 7 and the receiving side audio CODEC 9 corresponding to the type information so as to use the audio CODEC 9 corresponding to the type information contained in the received N-CONN message as the receiving side audio CODEC (at S13 shown in FIG. 13).

The receiving side TDM-SW controlling unit 14 controls the receiving side TDM-SW 8 corresponding to the informed connection pattern (at S13 shown in FIG. 13).

Thereafter, the narrow band signaling controlling unit 13 of the receiving side AWN 5 (#2) sends back the N-CONN message to the transmitting side AWN 5 (#1) under the control of the receiving side narrow band call controlling unit 12 (at S14 shown in FIG. 13). At this point, the narrow band signaling controlling unit 13 sets a value (01: 8 kbps, 10: 16 kbps, 11: 32 kbps) corresponding to the type of the audio CODEC 9 selected on the receiving side as type information to an intermediate speed field of a lower layer matching (code group 7) information element of the N-CONN message.

The receiving side AWN 5 (#2) sends back the N-CONN message to the transmitting side AWN 5 (#1) through a particular broad band VC.

The N-CONN message is received by the narrow band call controlling unit 12 through the broad band controlling unit 6 and the broad band—narrow band IF controlling unit 17 of the transmitting side AWN 5 (#1).

The transmitting side narrow band call controlling unit 12 causes the transmitting side TDM-SW controlling unit 14 to connect the transmitting side TDM-IF 7 and the transmitting side audio CODEC 9 corresponding to the type information so as to use the audio CODEC 9 corresponding to the type information contained in the received N-CONN message as a transmitting side audio CODEC (at S15 shown in FIG. 13).

The transmitting side TDM-SW controlling unit 14 controls the transmitting side TDM-SW 8 corresponding to the informed connection pattern (at S15 shown in FIG. 13).

Thereafter, the transmitting side narrow band call controlling unit 12 sends back the N-CONN message to the transmitting side PBX1 through the transmitting side narrow band signaling controlling unit 13 (at S16 shown in FIG. 13). Thus, the digital one-link connection is accomplished between the transmitting side PBX1 and the receiving side PBX3.

Next, the operation of the AWN 5 shown in FIGS. 2 and 3 according to a fourth preferred embodiment will be described.

As with the operation of the AWN 5 according to the third preferred embodiment, in the operation of the AWN 5 according to the fourth preferred embodiment, it is assumed that the PBX2 (see FIG. 2) or the like connected to the receiving side AWN 5 (#2) obtains the type information of the audio CODEC used on the destination route in the receiving side narrow band network with an N-ISDN message and that the PBX2 or the like informs the AWN 5 (#2) connected thereto of the type information with an N-ISDN message. In addition, while a signal is being communicated, the type of an audio CODEC can be changed.

In the structure, when the audio CODEC in the route of the transmitting side or receiving side narrow band network is changed due to a variation of the communication quality, a PBX with a changed audio CODEC informs the narrow band/broad band controlling unit 6 of the changed audio CODEC through the narrow band signaling controlling unit 13 in the AWN 5 connected to the PBX. Thus, the audio CODEC 9 used in the AWN 5 is changed corresponding to the type information. The destination side AWN 5 is informed of the type information through a particular B-ISDN VC. The broad band controlling unit 6 in the destination side AWN 5 informs the narrow band call controlling unit 12 in the destination side AWN 5 of the type information through the broad band—narrow band IF controlling unit 17 of the narrow band controlling unit 5 in the destination side AWN 5. Thus, the destination side AWN 5 selects an audio CODEC 9 with the same type as the changed audio CODEC 9 selected on the route in the narrow band network.

Next, with reference to a sequence chart shown in FIG. 14, the practical control process will be described.

In the same process as the conventional system, a broad band signaling message and a narrow band signaling message are transmitted between the transmitting side PBX1 and the receiving side PBX3 (at S1 to S14 shown in FIG. 14). At this point, the sequence shown in FIG. 8, 11, or 13 may be executed so as to select an audio CODEC.

Figure 15:
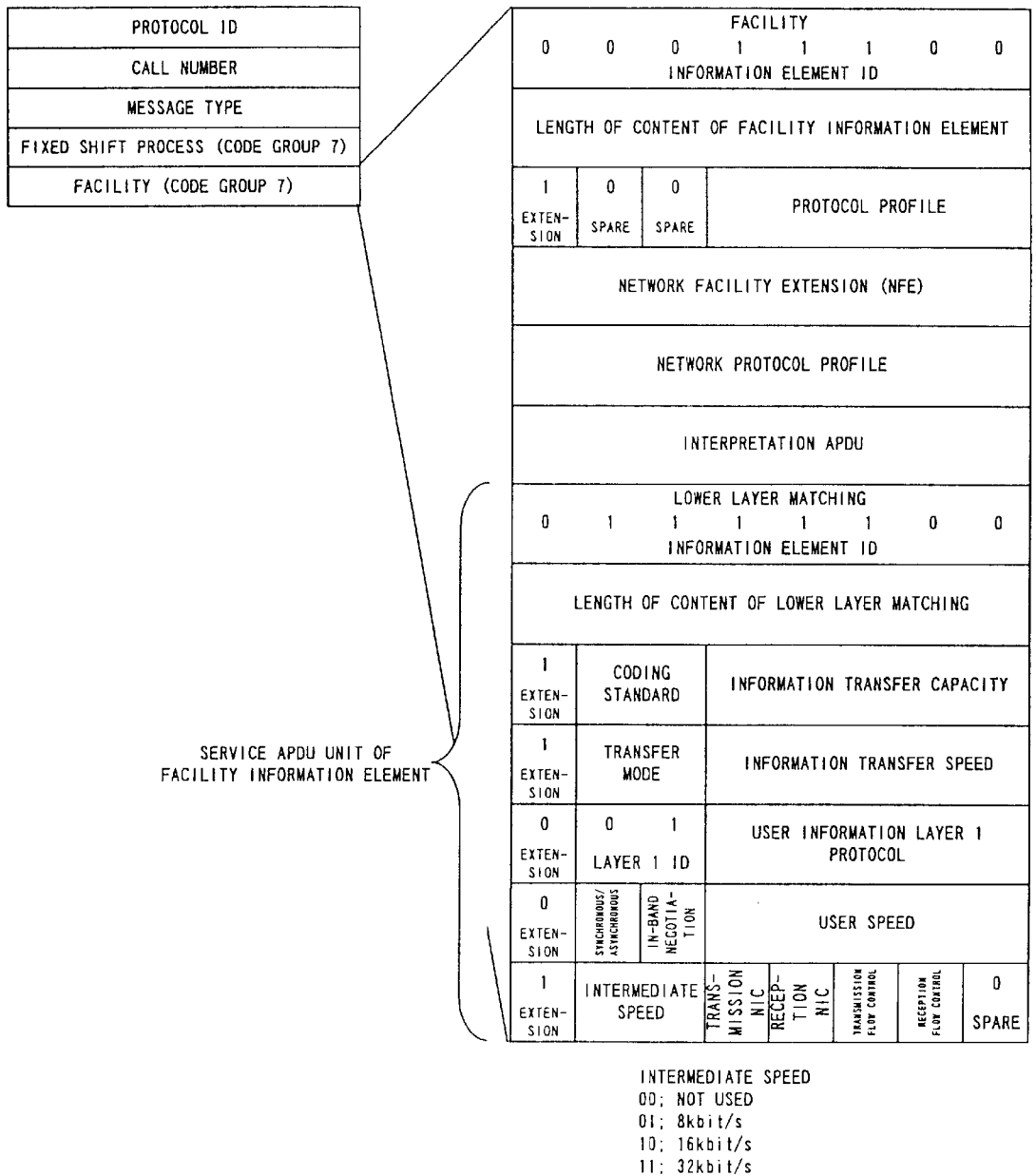
FIG. 15 is a schematic diagram showing the structure of a FACility (N-ISDN) message.

When an audio CODEC on the route in the receiving side narrow band network is changed due to a variation of communication quality, the receiving side PBX sends back an N-ISDN FACility message (N-FAC message) to the receiving side AWN 5 (#2) (at S16 shown in FIG. 14). The N-FAC message has the structure shown in FIG. 15. The PBX2 sets a value (01: 8 kbps, 10: 16 kbps, 11: 32 kbps) corresponding to the type of the audio CODEC changed on the route of the receiving side as type information to an intermediate speed field of a facility (code group 7) information element of the N-FAC message (at S15 shown in FIG. 14).

The narrow band signaling controlling unit 13 of the receiving side AWN 5 (#2) terminates the N-FAC message received from the PBX2 and informs the narrow band call controlling unit 12 in the receiving side AWN 5 (#2) of the information (at S17 shown in FIG. 14).

Since the receiving side narrow band call controlling unit 12 uses the audio CODEC 9 corresponding to the type information contained in the received N-FAC message as a new audio CODEC on the receiving side, the receiving side narrow band call controlling unit 12 causes the receiving side TDM-SW controlling unit 14 to connect the receiving side TDM-IF 7 to the receiving side audio CODEC 9 corresponding to the type information (at S17 shown in FIG. 14).

The receiving side TDM-SW controlling unit 14 controls the receiving side TDM-SW 8 corresponding to the informed connection pattern (at S17 shown in FIG. 14).

Thereafter, the narrow band signaling controlling unit 13 of the receiving side AWN 5 (#2) sends back the N-FAC message to the transmitting side AWN 5 (#1) under the control of the receiving side narrow band call controlling unit 12 (at S18 shown in FIG. 14). At this point, the narrow band signaling controlling unit 13 sets a value (01: 8 kbps, 10: 16 kbps, 11: 32 kbps) corresponding to the type of the audio CODEC 9 changed on the receiving side as type information to the intermediate speed field of the facility (code group 7) of the N-FAC message as type information.

The receiving side AWN 5 (#2) sends back the N-FAC message to the transmitting side AWN 5 (#1) through a particular broad band VC.

The N-FAC message is received by narrow band call controlling unit 12 through the broad band controlling unit 6 and the broad band—narrow band IF controlling unit 17 in the transmitting side AWN 5 (#1).

The transmitting side narrow band call controlling unit 12 causes the transmitting side TDM-SW controlling unit 14 to connect the transmitting side TDM-IF 7 to the transmitting side audio CODEC 9 corresponding to the type information of the transmitting side TDM-IF 7 so as to use the audio CODEC 9 corresponding to the type information contained in the received N-FAC message as a new audio CODEC (at S19 shown in FIG. 14).

The transmitting side TDM-SW controlling unit 14 controls the transmitting side TDM-SW 8 corresponding to the informed connection pattern (at S19 shown in FIG. 14).

In the above-described process, the audio CODEC is switched during the digital one-link communication.

Figure 16:
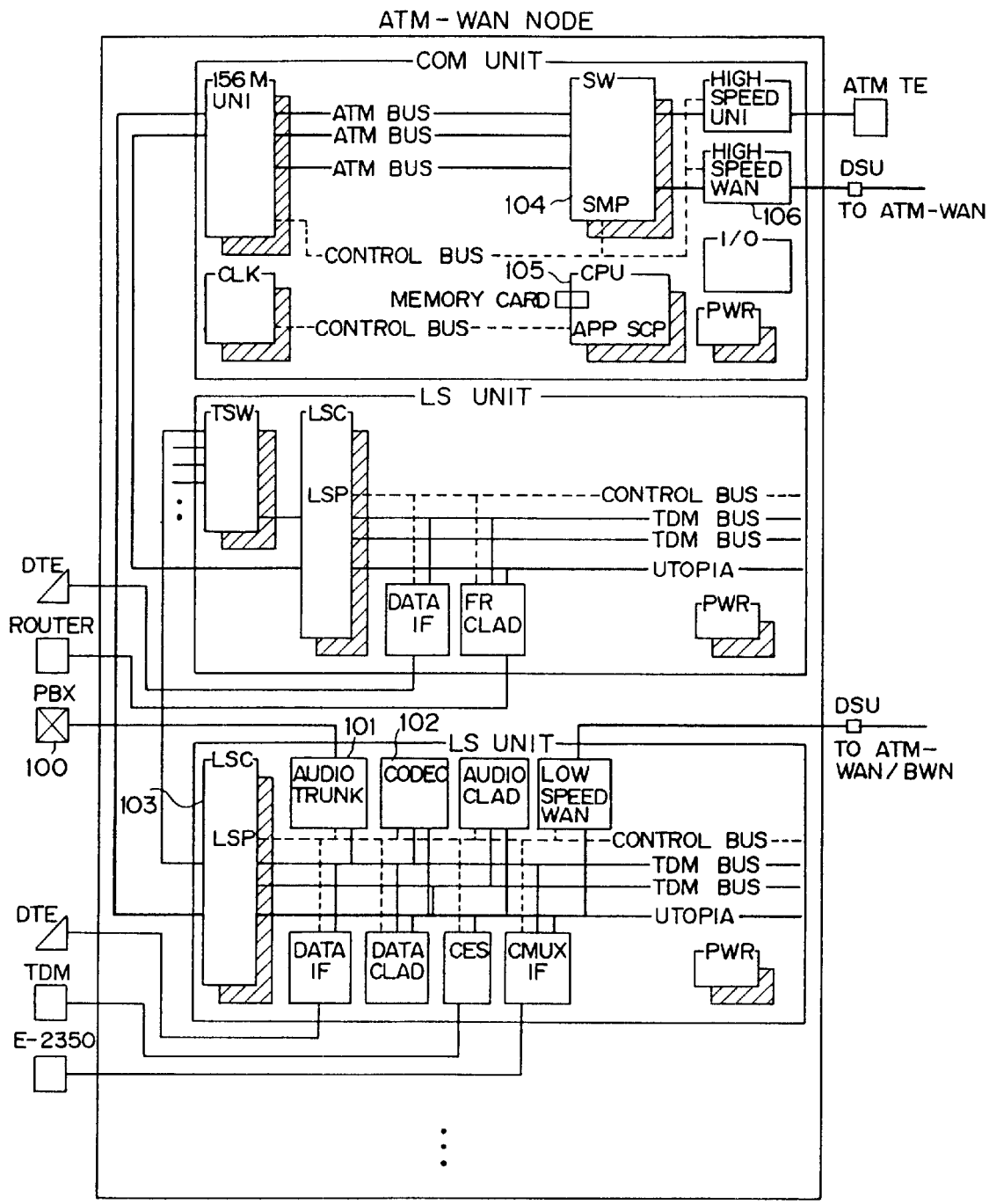
FIG. 16 is a schematic diagram showing the structure of an AWN according to a practical embodiment.

FIG. 16 is a schematic diagram showing the structure of the AWN 5 shown in FIGS. 2 and 3 according to a practical embodiment.

In FIG. 16, a PBX100 corresponds to the PBX1 or PBX2 shown in FIG. 2.

An audio trunk circuit 101 corresponds to the TDM-IF 7 shown in FIG. 3.

A CODEC 102 corresponds to the audio CODEC 9 (including the CLAD) shown in FIG. 3.

A unit corresponding to the ATM-SW 10 shown in FIG. 3 is omitted in FIG. 16.

An LSP 103 corresponds to the narrow band controlling unit 5 shown in FIG. 3.

A switch circuit (SW) 104 corresponds to the ATM-SW 10 shown in FIG. 3.

A CPU 105 corresponds to the broad band controlling unit 6 shown in FIG. 3.

A high speed WAN interface circuit 106 corresponds to the ATM-IF 11 shown in FIG. 3.

The above-described system corresponding to the structure shown in FIGS. 2 and 3 is an audio CODEC selecting system based on an audio communication. However, it should be noted that the present invention is not limited to such a system.

Figure 17:
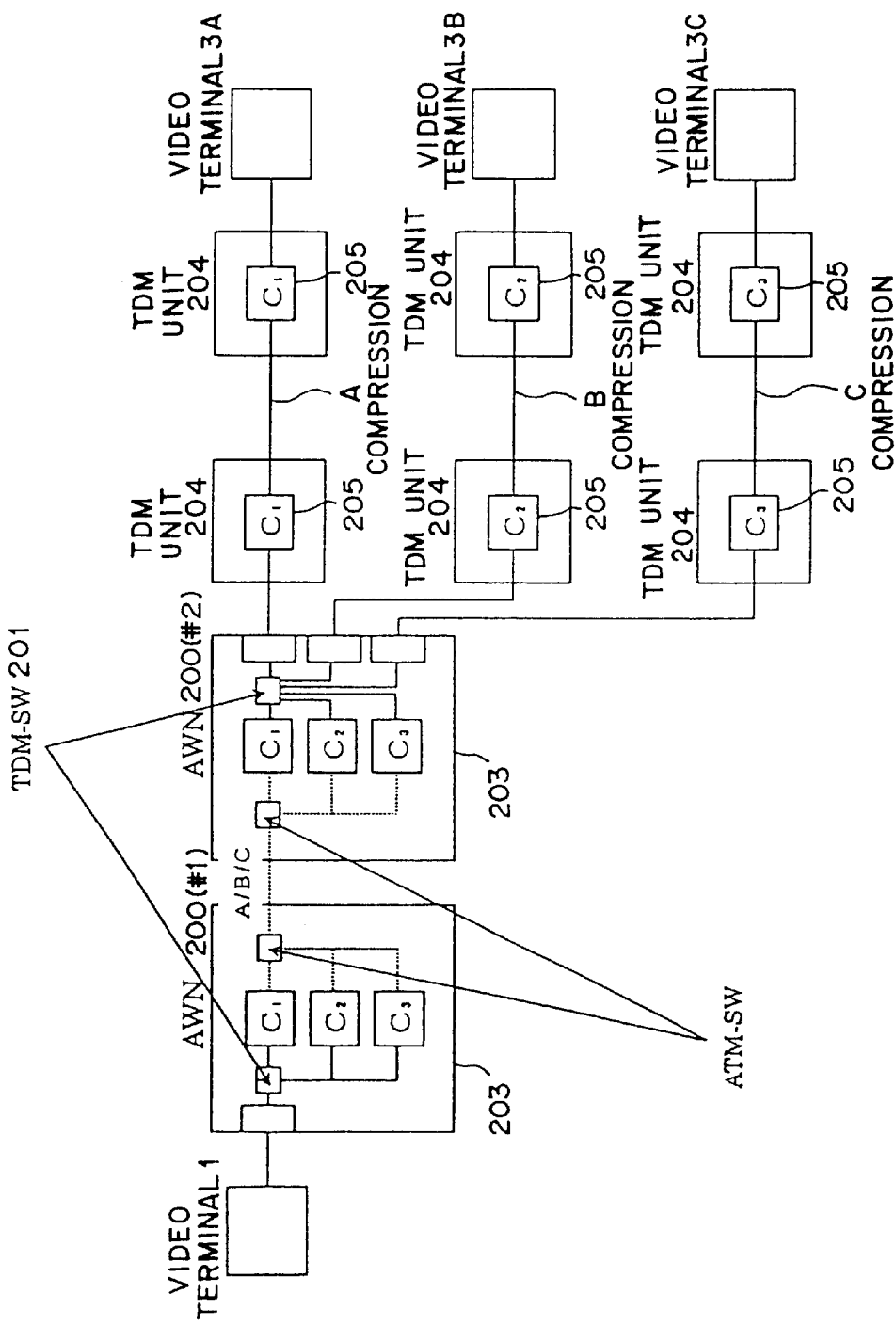
FIG. 17 is a schematic diagram showing a first example of the structure of a system including video terminals.

FIG. 17 is a schematic diagram showing a first example of the structure of a system including video terminals according to a practical embodiment.

Video terminals 1 and 3A to 3C are connected by a TDM-SW 201, an ATM-SW 202, an AWN 200 (#1), an AWN 200 (#2), and a TDM unit 204. Each of the AWNs 200 includes a plurality of selectable video encoding/decoding units 203. The TDM unit 204 includes a video encoding/decoding unit 205. At the beginning of a video communication or during the video communication, when a particular video encoding/decoding unit 205 is selected in a TDM unit 204 in the narrow band network, as with the system in the structure shown in FIGS. 2 and 3, an AWN 200 can select a video encoding/decoding unit 203 corresponding to the selected video encoding/decoding unit 205.

FIG. 18 is a schematic diagram showing a second example of the structure of a system including video terminals according to a practical embodiment.

The system shown in FIG. 18 does not include a TDM unit. Video terminals 1 and 3A to 3C are connected by an AWN 300, an AWN 300', and video encoding/decoding units 305. The AWN 300 includes a TDM-SW 301, an ATM-SW 302, and a plurality of selectable vide picture encoding/decoding units 303. The AWN 300' includes a TDM-SW 301, an ATM-SW 302, and a CLAD (cell assembling/disassembling unit) 304. The video encoding/decoding units 305 are disposed corresponding to the video terminals 3A to 3C. In this case, the AWN 300 can select a video encoding/decoding unit 303 corresponding to a video encoding/decoding unit 305 for use with a connected video terminal 3 (3A to 3C).

What is claimed is:

1. A broad band—narrow band connection node unit for communicating digital data between a narrow band network and a broad band network in an encoding/decoding format that is the same as an encoding/decoding format used on a communication route in the narrow band network in an integrated network composed of the broad band network and the narrow band network, comprising:

at least one encoding/decoding unit having a digital one-link function that causes compressed digital data to be passed or to be decompressed only at a communication termination point depending on a setting of the compressed digital data so as to prevent a quality of the digital data from deteriorating;

an individual encoding/decoding format managing unit storing the relation between each destination route in the narrow band network and formats of said encoding/decoding unit used on each destination route; and an encoding/decoding unit selecting unit asking said individual encoding/decoding format managing unit the format of the encoding/decoding unit corresponding to the destination route information included in signaling data and selecting one of said encoding/decoding unit corresponding to the obtained format.

2. The broad band—narrow band connection node unit as set forth in claim 1, wherein after the broad band—narrow band connection node unit that is directly connected to a route selecting unit in the narrow band network selects one of said encoding/decoding unit corresponding to a destination route in the narrow band network, the broad band—narrow band connection node unit informs a destination side broad band—narrow band connection node unit of a format information of the selected one of said encoding/decoding unit and the destination side broad band—narrow band connection node unit selects one of said encoding/decoding unit corresponding to the informed format information.

3. The broad band—narrow band connection node unit as set forth in claim 2, wherein the broad band—narrow band connection node that is directly connected to the route selecting unit in the narrow band network selects one of said encoding/decoding unit corresponding to the format information of said encoding/decoding unit used in the destination route and received from the route selecting unit.

4. The broad band—narrow band connection node unit as set forth in claim 2, wherein the format information is received as a lower layer matching information element included in a narrow band signaling message.

5. The broad band—narrow band connection node unit as set forth in claim 1, wherein when a format of said encoding/decoding unit used in the narrow band network is changed during the digital data communication, the broad band—narrow band connection node unit and the destination side broad band—narrow band connection node unit exchange a format information of the said encoding/decoding unit that was changed so as to change said encoding/decoding unit used in the broad band—narrow band connection node unit and the destination side broad band—narrow band connection node unit to said encoding/decoding unit corresponding to the format information.

6. The broad band—narrow band connection node unit as set forth in claim 5, wherein the format information is transmitted with a facility information element included in a narrow band signaling message.

7. A broad band—narrow band connecting method for communicating digital data between a narrow band network and a broad band network in an encoding/decoding format that is the same as an encoding/decoding format used on a communication route in the narrow band network in an integrated network composed of the broad band network and the mow band network, comprising:

disposing at least one encoding/decoding unit having a digital one-link function that causes compressed digital data to be passed or to be decompressed only at a communication termination point depending on a setting of the compressed digital data so as to prevent a quality of the digital data from deteriorating;

storing the relation between each destination route in the narrow band network and the format of the encoding/decoding unit used on each destination route;

asking the format of the encoding/decoding unit corresponding to the destination route information included in signaling data and selecting one of the encoding/decoding unit corresponding to an obtained format;

when the format of the encoding/decoding unit used in the narrow band network is changed during the digital data communication, exchanging the format information of the encoding/decoding unit that was changed so as to change an encoding/decoding unit used in a broad band—narrow band connection node unit and the destination side broad band—narrow band connection node unit to said encoding/decoding unit corresponding to the exchanged format information; and transmitting the format information with a facility information element included in a narrow band signaling message.

8. The broad band—narrow band connecting method as set forth in claim 7, further comprising:

after the broad band—narrow band connection node unit that is directly connected to a route selecting unit in the narrow band network selects one of the encoding/decoding unit corresponding to a destination route in the narrow band network, causing the broad band—narrow band connection node unit to inform a destination side broad band—narrow band connection node unit of a format information of the selected one of the encoding/decoding unit; and causing the broad band—narrow band connection node unit to select one of the encoding/decoding unit corresponding to the informed format information.

9. The broad band—narrow band connecting method as set forth in claim 8, further comprising:

causing the broad band—narrow band connection node that is directly connected to the route selecting unit in the narrow band network to select one of the encoding/decoding unit corresponding to the format information of the encoding/decoding unit used in the destination route and received from the route selecting unit.

10. The broad band—narrow band connecting method as set forth in claim 8, further comprising:

causing the broad band—narrow band connection node to inform the destination side broad band—narrow band connection node of the format information with a lower layer matching information element included in a narrow band signaling message.

11. The broad band—narrow band connecting method as set forth in clam 7, further comprising:

when the format of the encoding/decoding unit used in the narrow band network is changed during the digital data communication, causing the broad band—narrow band connection node unit and the destination side broad band—narrow band connection node unit to exchange a format information of the encoding/decoding unit that was changed so as to change the encoding/decoding unit used in the broad band—narrow band connection node unit and the destination side broad band—narrow band connection node unit to the encoding/decoding unit corresponding to the format information.

12. The broad band—narrow band connecting method as set forth in claim 11, further comprising:

transmitting the format information with a facility information element included in a narrow band signaling message.

13. A broad band—narrow band connection node unit for communicating digital data between a narrow band network and a broad band network in an encoding/decoding format that is the same as an encoding/decoding format used on a communication route in the narrow band network in an integrated network composed of the broad band network and the narrow band network, comprising:

at least one encoding/decoding means having a digital one-link function that causes compressed digital data to be passed or to be decompressed only at a communication termination point depending on a setting of the compressed digital data so as to prevent a quality of the digital data from deteriorating;

individual encoding/decoding format managing means for storing the relation between each destination route in the narrow band network and the formats of said encoding/decoding means used on each destination route; and encoding/decoding means selecting means for asking said individual encoding/decoding means corresponding to the destination route information included in signaling data and selecting one of said encoding/decoding means corresponding to an obtained format; wherein after the broad band—narrow band connection node unit that is directly connected to a route selecting unit in the narrow band network selects one of said encoding/decoding means corresponding to a destination route in the narrow band network, the broad band—narrow band connection node unit informs a destination side broad band—narrow band connection node unit of format information of the selected one of said encoding/decoding means and the destination side broad band—narrow band connection node unit selects one of said encoding/decoding means corresponding to the informed format information;

the broad band—narrow band connection node that is directly connected to the route selecting unit in the narrow band network selects one of said encoding/decoding means corresponding to the format information of said encoding/decoding means used in the destination route and received from the route selecting unit;

the format information is received as a lower layer matching information element included in a narrow band signaling message;

when the format of said encoding/decoding means used in the narrow band network is changed during the digital data communication, the broad band—narrow band connection node unit and the destination side broad band—narrow band connection node unit exchange the format information of the said encoding/decoding means that was changed so as to change said encoding/decoding means used in the broad band—narrow band connection node unit and the destination side broad band—narrow band connection node unit to said encoding/decoding means corresponding to the format information; and the format information is transmitted with a facility information element included in a narrow band signaling message.

* * * * *